(12) United States Patent
Coquis Sánchez-Concha

(10) Patent No.: US 10,815,941 B2
(45) Date of Patent: Oct. 27, 2020

(54) FLUID MECHANICS SYSTEM FOR THE PERFORMANCE OPTIMIZATION OF CATALYTIC ALLOYS AND THE IMPROVEMENT OF ITS MICROBIOLOGICAL CONTAMINANTS ELIMINATION PROPERTIES IN HYDROCARBONS

(71) Applicant: Rodrigo Coquis Sánchez-Concha, Lima (PE)

(72) Inventor: Rodrigo Coquis Sánchez-Concha, Lima (PE)

( * ) Notice: Subject to any disclaimer, the term of this patent is extended or adjusted under 35 U.S.C. 154(b) by 22 days.

(21) Appl. No.: 16/461,507

(22) PCT Filed: Mar. 2, 2017

(86) PCT No.: PCT/PE2017/000003
§ 371 (c)(1),
(2) Date: May 16, 2019

(87) PCT Pub. No.: WO2018/160078
PCT Pub. Date: Sep. 7, 2018

(65) Prior Publication Data
US 2019/0345903 A1    Nov. 14, 2019

(51) Int. Cl.
*F02M 27/02* (2006.01)
*B01J 35/02* (2006.01)
*B01J 23/14* (2006.01)
*B01J 23/18* (2006.01)

(52) U.S. Cl.
CPC .............. *F02M 27/02* (2013.01); *B01J 23/14* (2013.01); *B01J 23/18* (2013.01); *B01J 35/023* (2013.01)

(58) Field of Classification Search
CPC . F02M 27/02; B01J 23/14; B01J 23/18; B01J 35/023

USPC ......................................................... 123/538
See application file for complete search history.

(56) References Cited

U.S. PATENT DOCUMENTS

| 5,816,225 A | 10/1998 | Koch | |
| 6,024,073 A * | 2/2000 | Butt | F02M 27/02 123/538 |
| 6,205,985 B1 * | 3/2001 | Funagayama | B01J 23/835 123/538 |
| 2007/0193537 A1 * | 8/2007 | Miyasaka | C01B 3/40 123/538 |

FOREIGN PATENT DOCUMENTS

WO    WO 00/17291    3/2000

OTHER PUBLICATIONS

Search Report issued in Int'l App. No. PCT/pe2017/000003 (dated 2017).

* cited by examiner

*Primary Examiner* — Syed O Hasan
(74) *Attorney, Agent, or Firm* — Barnes & Thornburg LLP

(57) ABSTRACT

The present invention is a fluids mechanical system for optimizing the catalytic effect of catalytic alloys for the elimination of microbiological contaminants in hydrocarbon fuels, that has catalytic alloy pieces mainly formed of tin and antimony, which are contained in a container that can be a metal tube, a stainless steel mesh or another type of plastic container, characterized in that the volume of the pieces or pellets of catalytic alloy is less than 60 cubic millimeters, preferably between 10 cubic millimeters and 45 cubic millimeters, the pieces having a spherical, disc or irregular shape.

15 Claims, 6 Drawing Sheets

Figure 1:
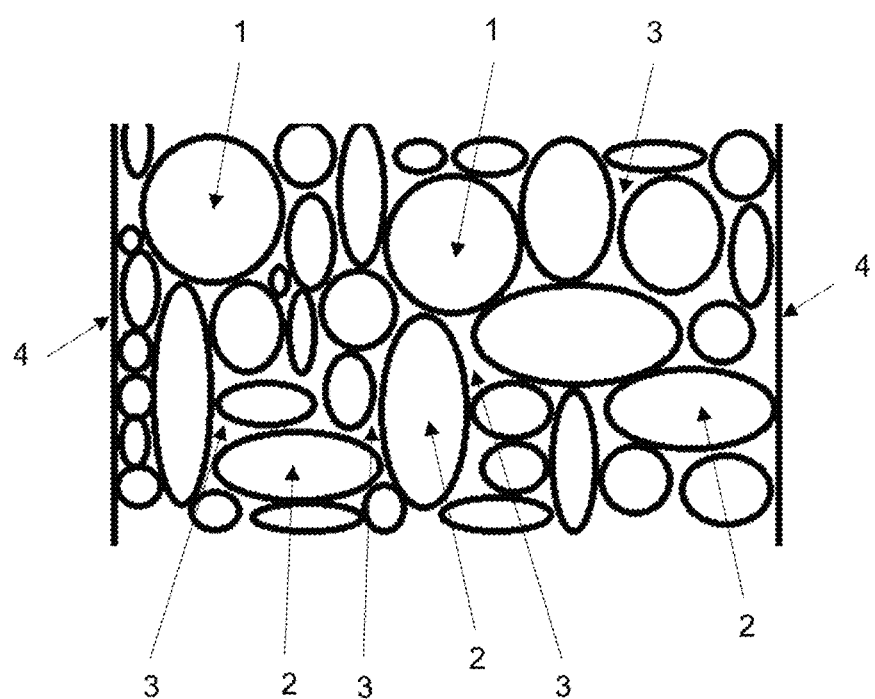

FLUID MECHANICS SYSTEM FOR THE PERFORMANCE OPTIMIZATION OF CATALYTIC ALLOYS AND THE IMPROVEMENT OF ITS MICROBIOLOGICAL CONTAMINANTS ELIMINATION PROPERTIES IN HYDROCARBONS

CROSS REFERENCE TO RELATED APPLICATIONS

This application is a U.S. nationalization under 35 U.S.C. § 371 of International Application No. PCT/PE2017/000003, filed Mar. 2, 2017. The disclosure set forth in the referenced application is incorporated herein by reference in its entirety.

TECHNICAL FIELD

This invention corresponds to the technical field of petrochemical catalysts. It specifically refers to a fluid mechanics system for catalytic alloys for the elimination of microbiological contaminants in hydrocarbon fuels.

STATE OF THE ART

Commercial fuels usually contain microbiological contaminants that reduce their efficiency when burned in engines or burners, affecting their engine performance, cold pumpability, reduces the injection pump life span, clogs the injectors and eventually reduces the combustion efficiency causing loss of power, soot formation, increasing the need of changing the lubricating oil and its filter more frequently, and increasing the emission of toxic exhaust gases to the environment.

These microbiological contaminants are mainly bacteria, molds and yeasts, which grow spontaneously in said hydrocarbon fuels. Their growth is accelerated when fuels do not contain biocides additives or contain moisture.

Different catalytic alloys technologies, generally mainly composed by tin and antimony, solve this problem by inhibiting the growth of these microorganisms and eliminating them progressively.

These are known as fuel catalysts. In addition to the mentioned elements, these alloys often include other metals to enhance their effectiveness, such as lead, bismuth, silver, zinc, copper, selenium, among others.

Some examples of these technologies are the following patents: U.S. Pat. No. 8,298,405 B2 "Apparatus and method for resuscitating and revitalizing hydrocarbon fuels" in which the incorporation of metals lead and bismuth is detailed in smaller proportions, being a solid, nanostructures or a thin film as preferent embodiment; and U.S. Pat. No. 6,306,185 B1 "Method and device for treating fuel" which describes an alloy composed of zinc, cerium, palladium, magnesium and silver and a system to be connected with the fuel hose of the injection system of a combustion engine and a device designed to be installed inside the fuel tank, being a pellet the preferent embodiment of the alloy. In addition, U.S. Pat. No. 5,580,359 discloses a system of catalytic elements with shape of pellets or cones contained within a container of plastic or metallic material and which are supported and separated in levels by steel meshes. Finally, US2002139044 describes another composition, which involves a mixture of tin, antimony, zinc and silver.

These inventions describe technologies that look for improving the efficiency of catalytic alloys system for eliminating microorganisms in hydrocarbon fuels with special emphasis on the alloy composition and its parts arrangement. However, these technologies do not comprise morphological modifications to the alloy pieces nor a channels system generation (3) which may intensify the treatment by increasing the proximity of the catalytic elements, or which optimizes the active surface of the alloy, while being easy to manufacture.

According to experimental results obtained in the development process of this product, there is a direct correlation between the surface area of the solid alloy and its catalytic effect. In that sense, the greater the surface area, the greater the intensity of fuel treatment. In addition, these alloys have these properties due to interaction with iron containing metals, the fuel is present and in contact with both of them.

Thus, a problem of current technologies is that since a generally not insignificant size pellet (diameter between 1 to 2 centimeters) is the shape generally used by these technologies, and when the catalytic effect is produced when the surface of the alloy is exposed to a metallic material mainly composed by iron, the only alloy part that would have an active function would be the pellet surface. For this reason, that a great inefficiency or opportunity for improvement is caused, when the volume is not used and the molecules contained within the pellet surface, which clearly are not in contact with the fuel nor exposed to a ferrous metal surface.

Moreover, there are technologies that optimize the ratio between the weight or density and surface area, as the metallic foams, which have solid morphologies with a large number of pores interconnected throughout all the volume; or micro or nanostructures, which presents formations of structures which are in peaks, threads, shells, spheres, tubes shape among other types of micro or nanometer-sized shapes. The problem with these alternatives is that the manufacturing process is often complex and, in some cases, not very reproducible. In addition, they are fragile, so when these structures impact with another surface, they usually break totally or partially, showing a poor capability for absorbing or dissipating mechanical energy. Therefore, these are impractical alternatives to be applied under vibrations, acceleration and collisions conditions, for example, in a motorized vehicle.

During the research process, the proximity between the alloy pieces was discovered as a relevant factor for the effect of these catalytic alloys and the mechanical fluid system is defined by the gaps between them. In this way, while having an arrange of greater number of these pieces very closely to each other, and narrow gaps with certain size allowing the fuel flows through the spaces between said pieces, the catalytic effect will be optimized. So far, technological proposals in this technical field do not show innovations applying these methods, so this is also an improvement field.

Therefore, there is a great opportunity for improving the describe technologies with respect to innovations in morphology and size of the alloy solids, mechanical fluid systems, and systems of interaction between the catalytic alloy and parts of the system containing iron.

DESCRIPTION OF THE INVENTION

The purpose of this invention is defining a mechanical fluid system for catalytic alloys allowing the maximization of this technology properties for removing the microbiological contaminants in the hydrocarbon fuels, in such a way that making this process faster and more effective than current fuel catalyst technologies. This is achieved by improving the morphology of the catalytic alloy solids and, therefore, the interaction between the catalytic alloy pieces, the fuel and metals, of which composition is mainly iron, besides the fluids mechanical system through which they are carried out, and the features that optimized the operation.

Thus, the main feature for increasing the efficiency of the catalytic alloy is that the alloy solids are small pieces which volume is smaller than 60 cubic millimeters. This will ideally be small spheres or small disks which diameter is less or equal than 6 millimeters and higher or equal than 1 millimeter, and may also have irregular shapes that resemble the shapes described above. In this way, the ratio between weight and exposed surface area is increased significantly compared to the traditional way of performing, that is, by pellets or cones with more than 1 centimeter in diameter.

These small pieces can be contained in a mainly iron container, which could be a stainless steel mesh, a tube, or other structure or containment mean. In this way, as there are gaps between the small pieces, the fuel can flow through the gaps and intensively be treated by the system generated by the catalytic alloy pieces and the iron container.

In addition, the shape and volume of the alloy pieces defined above cause that when they are compressed at a density of about 8.5 grams of alloy per cubic centimeter, narrow channels (3) are produced between them by which the fuel can flow. This optimizes the interaction between the fuel and the catalytic alloy pieces, accelerating the purification and optimization of the properties, compared to other densities.

Another advantage of this technology is the great capacity for dissipating mechanical energy caused by collisions or vibrations. This feature is achieved because the small parts can collide and rub against each other, carrying out kinetic energy between a large amount of small alloy pieces. In this way, this invention is practical to apply in situations of vibrations and collisions, such as cars.

Likewise, due to the system caused in which there are channels (3) between the small pieces and not having a solid mass of relatively significant size. the devices, accessories or reactors weight is reduced, in which this technology is applied, while increasing efficiency.

Finally, another technical advantage of this innovation is that it is easily and reproducible manufacturing.

LIST OF FIGURES

Figure 2:
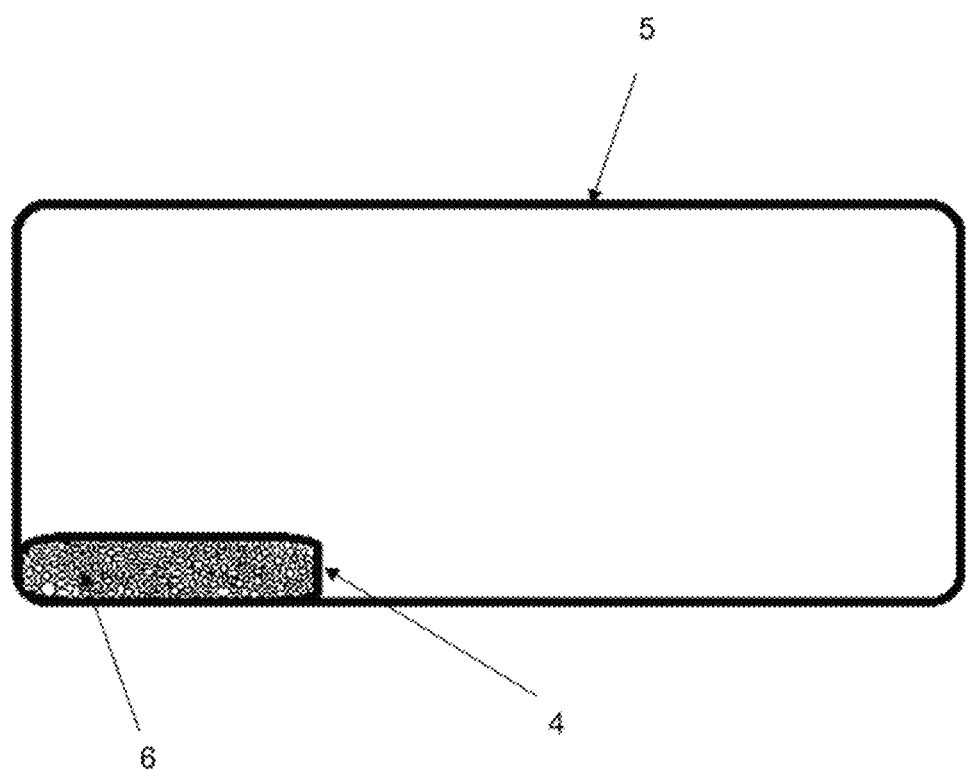
Figure 3:
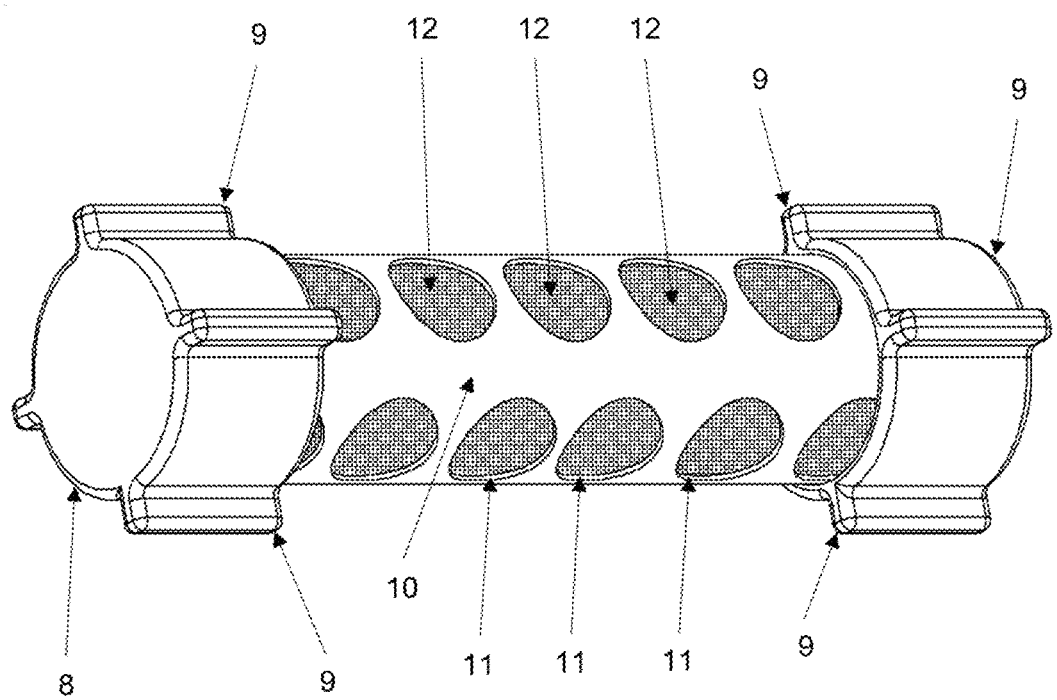

The present invention shows the following figures:
FIG. 1: Cross section of catalytic alloy pieces contained in a container.
1: Spherical shape catalytic alloy pieces
2: Catalytic alloy disc shape pieces
3: Channels
4: Container walls
FIG. 2: Cross section of a common fuel tank with a device for removing microbiological contaminants combustible liquid hydrocarbons using metallic alloys according to the described mechanical fluid system.
5: Device
6: Fuel tank
7: Catalytic alloy pieces
FIG. 3: Device containing the fluids mechanics system for the catalytic treatment of fuel.
8: Lids
9: Stops
10: Solid housing
11: Holes
12: Container mesh FIG. 4: Comparative graph of the octane variation through time of two samples of 500 ml of gasoline being treated by pieces of catalytic alloys of different shape.

The graph shows how the octane rating of gasoline treated with low volume pieces of irregular, spherical and discs shape compressed to 8.5 grams of alloy per cubic centimeter, increases faster than gasoline treated with pellets of two centimeters diameter and one centimeter high.

Figure 5:
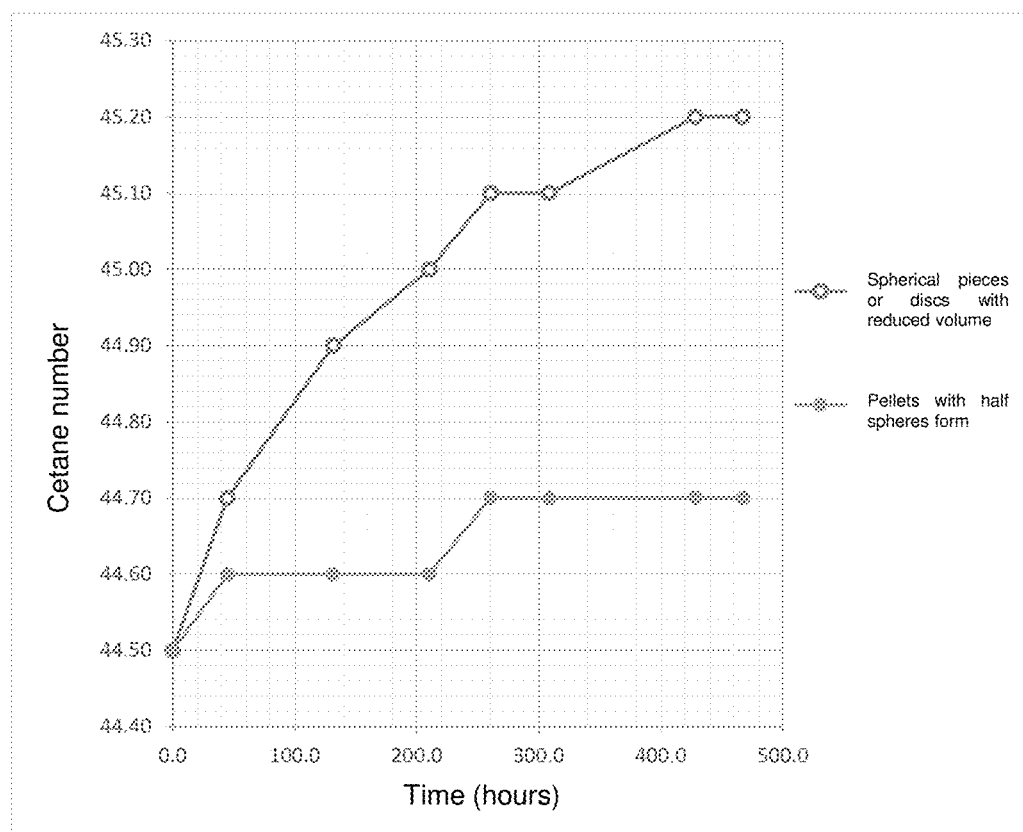

FIG. 5: Comparative graph of variation of cetane number with respect to the time of two samples of 500 ml of diesel being treated by pieces of catalytic alloys of different shape and size.

The graph shows how the cetane number of the diesel treated with the low volume pieces of spherical, discs, and irregular shape compressed to 8.5 grams of alloy per cubic centimeter increases faster than the one of the diesel treated with pellets of two centimeters in diameter and one centimeter high.

Figure 6:
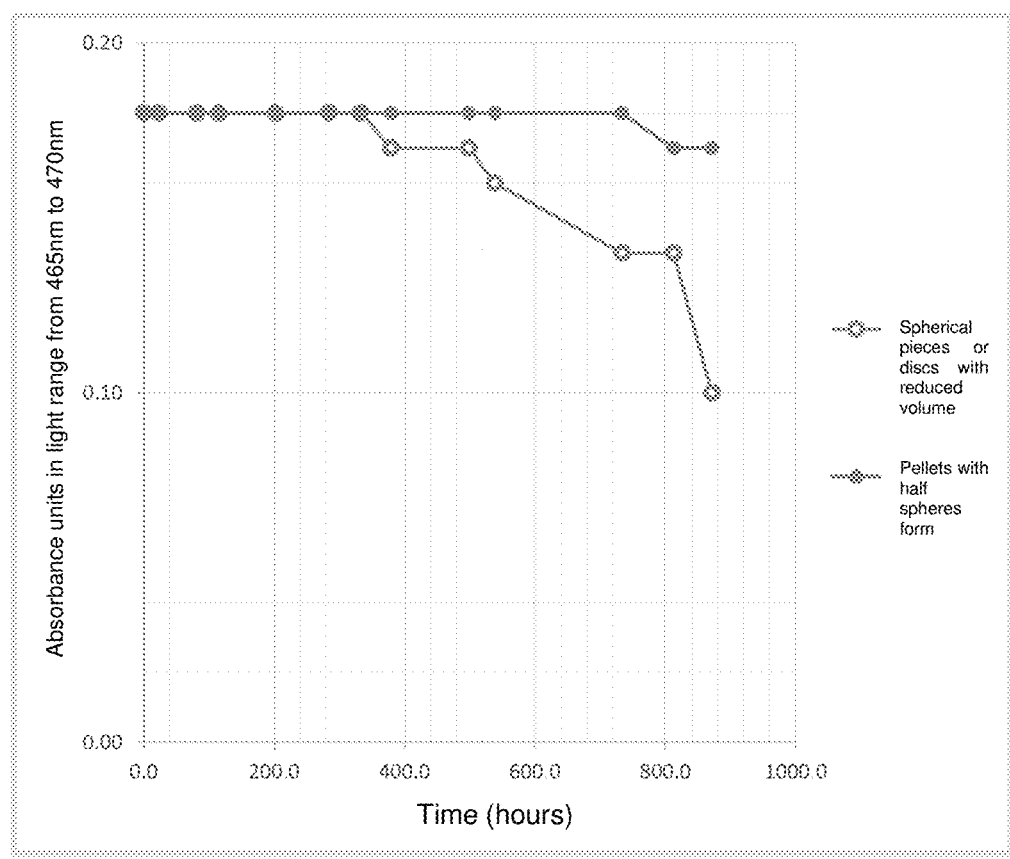

FIG. 6: Comparative graph of the variation of absorbance in blue range of visible light (465 nm-470 nm) through time of two samples of 500 ml of diesel being treated by pieces of catalytic alloys of different shape.

The graph shows how the absorbance of the diesel sample treated with reduced volume pieces of spherical, discs, and irregular shape compressed to 8.5 grams of alloy per cubic centimeter, was reduced faster than the one of the diesel treated with pellets of two centimeters in diameter and one centimeter high.

PREFERRED DESCRIPTION OF THE INVENTION

Despite the present invention may be materialized in many different ways as shown in the drawings and preferred descriptions for the invention will be described in detail hereinafter, it being understood that the present disclosure should be considered as an example of the principles of the invention and is not intended to limit the broad aspect of the invention to the examples illustrated.

As described before, for increasing the intensity of the catalytic activity of certain alloys capable of eliminating microbiological contaminants in hydrocarbon fuels and for improving the properties, a fluids mechanical system is proposed. It principally consists of small pieces of catalytic alloy (7), which volume is smaller to 60 cubic millimeters, preferably between 10 cubic millimeters and 45 cubic millimeters, and that the diameter of these pieces is greater than or equal to 1 millimeter and less than or equal to 6 millimeters, ideally 3 millimeters, and its shape ideally takes shape of sphere or disc, or irregular shapes. In the case of discs, it is recommended that the height of these be less than 3 millimeters, ideally less than 1.5 centimeters.

Likewise, the catalytic alloy pieces (7) are contained and compacted within a container (4) such that there are between 6 grams of alloy per cubic centimeter and 12 grams of alloy per cubic centimeter, preferably 8.5 grams of alloy per cubic centimeters. In addition, the container (4) will prevent the pieces from being freely displaced; directing the flow rate of the fuel in a desired manner or appropriately containing the alloy pieces so that they are in contact with the fuel. This container (4) can be a stainless steel mesh, a stainless steel tube with small holes, a fuel-insoluble plastic container with holes and any other means for holding the pieces inside the cavities, among other forms of containers. Preferably, it must be made of a material composed mainly of iron; the pieces must be exposed to a metal which alloy contains iron so that the catalytic effect can work.

In this way, as the catalytic alloy pieces (7) are compressed, channels (3) are formed by the gaps between them. Fuel can flow through these channels (3). Due to the reduced space and the distance between pieces, which is generally less than 1 mm, the interaction between them is very intense, so the effect of destroying microbiological contaminants is enhanced.

Thus, a mechanical fluid system for optimizing the catalytic effect of these alloys is defined.

Also, one practical way of materializing this invention is by a fuel tank (6) having a device (5) containing pieces of catalytic alloy (7) according to the mechanical system of fluids described above. The device (5) must be fixedly attached to the fuel tank (6) by clamping means such as clamps, bolts, flanges, among others. In this way, each time the tank (6) is fed with fuel, it will spontaneously treat it. This fuel tank can be fitted in cars, buses, trucks, generators or other machines that use an internal combustion engine or a burner, preventing problems caused by the microbiological contamination of the fuel with which they were supplied or optimize the properties of the same to promote a better performance in the combustion.

Another way materializing this invention is by a device for the catalytic purification of hydrocarbon fuels, which is designed to be immersed in fuel, and it gets into the device for being treated. It has a solid casing (10) which is a tube, preferably of cylindrical shape, made of an alloy mainly composed of iron and is preferably stainless. This solid casing has one or more holes (11) along its body. Within this solid casing (10) the pieces of catalytic alloy (7) of different shapes are contained. In order for the catalytic alloy pieces (7) to be contained within the solid casing (10) and not escaping through the holes (11), a container mesh (12) is incorporated into the solid casing (10) within which contains the pieces of catalytic alloy (7). The device has lids (8) at the ends, which seal the solid casing (10) preferably at pressure such that the containment mesh (12) and the catalytic alloy pieces (7) are held its interior. These lids (8) are made of soft material, which absorbs vibrations and insoluble in hydrocarbon fuels, preferably nitrile; and preferably have four tops (9) which are parallel to the body of the solid casing (10) and are spaced equidistantly. Thus, the function of the lids (8) is not only to keep the container mesh (12) and the catalytic alloy pieces (7) within the solid housing (10), but are useful to enable them to be introduced into a fuel tank and for preventing the device from rolling thanks to the tops (9), or producing sounds inside. As mentioned above, the catalytic alloy pieces (7) are contained within the device and are compacted at a density of about 8.5 grams of catalytic alloy per cubic centimeter in such a way as to optimize its properties.

In order to validate the improvement in the catalytic effect due to the fluids mechanical system proposed, tests were performed. In these tests, different samples of equal volume (500 milliliters) of fuel, gasoline and diesel, were exposed to the effect of pieces of the same catalytic alloy but of different shapes contained within containers of the same design. Different results over fuel quality improvement were quantified to define the difference between both cases. Shapes used were: pieces of reduced volume of irregular, spherical and disc shape compressed to 8.5 grams of alloy per cubic centimeter (according to the present invention) and pellets in the form of a half spheres of two centimeters in diameter and one centimeter high.

Figure 4:
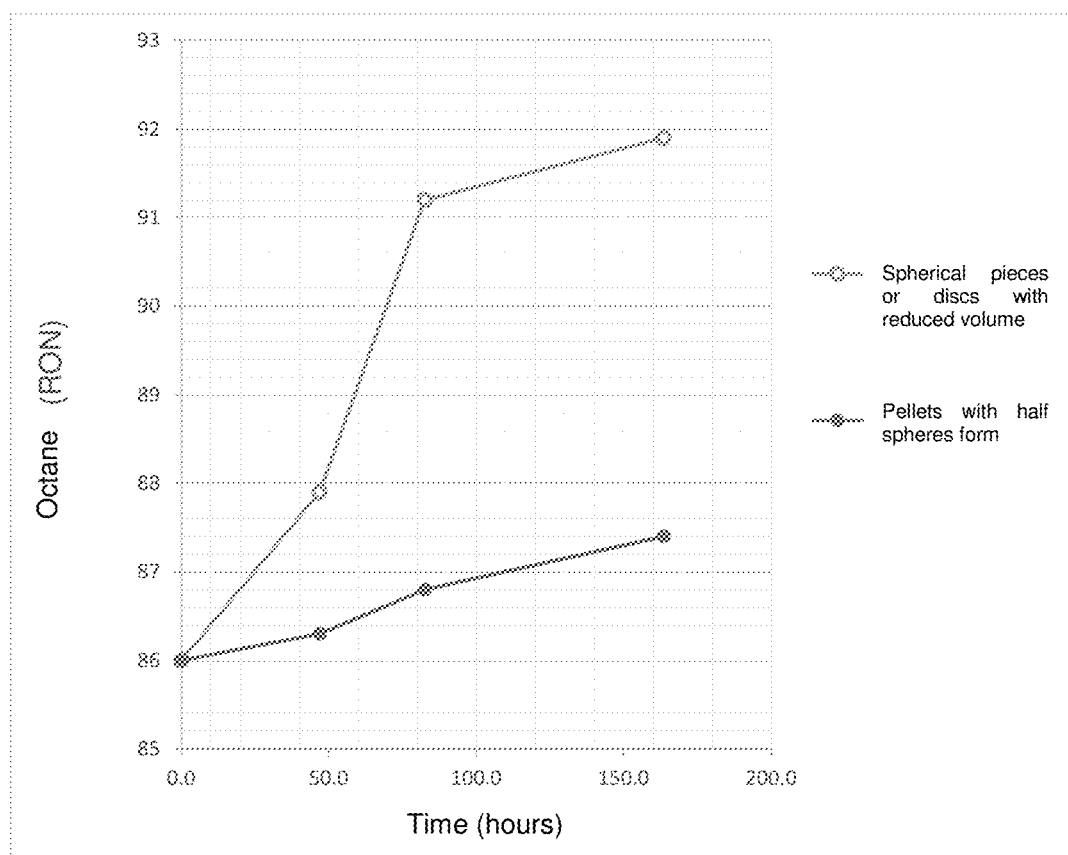

In the first test, the variation in the octane number in commercial gasoline was analyzed. The results are shown in FIG. 4. It shows that the octane of the gasoline treated with the technology proposed in the present patent increases between 3 to 4 times faster than traditional technology. The octane number was analyzed with a TERMEX OCTANE-IM octane and cetane meter.

In the second test, the cetane number variation in commercial diesel DB50 was analyzed. The results are shown in FIG. 5, in which it is appreciated that the cetane number of the sample treated with the present technology increases 2 to 4 times faster than traditional technology while achieving to increase the cetane number in 0.7, while traditional technology only increased 0.2. The cetane number was analyzed with an octane meter and cetanaje brand TERMEX OCTANE-IM model.

In the third test, the absorbance variation in visible blue light range (wavelength between 465 nm and 470 nm) of a commercial diesel DB50 sample inoculated with bacteria was analyzed. The results are shown in FIG. 6. It shows that the absorbance of the octane treated with the proposed technology started to reduce after 320 hours, while the traditional technology took 720 hours. On the other hand, the proposed technology reduced 0.08 absorbance units in 880 hours, while the traditional technology only reduced 0.01 units in the same amount of time. Another appreciation for this experience is that the sample treated with this new technology was visually much less turbid than traditional technology. It should be clarified that it is relevant to quantify the absorbance of said wavelengths because since this property correlates proportionally with the concentration of microbiological contamination contained in the fuel. In this way, it is shown that the technology is more than twice faster and eight times more effective for the elimination of microbiological contamination than current technologies.

The invention claimed is:

1. A fluids mechanical fluid system for optimizing the catalytic effect of catalytic alloys for the elimination of microbiological contamination in hydrocarbon fuels that have catalytic alloy parts mainly composed by tin and antimony which are contained inside a container, which may be a metal tube, a solid shell, a mesh or other containment means wherein the volume of the catalytic alloy pieces is less than 60 cubic millimeters, wherein the catalytic alloy pieces have spherical geometries whose diameter is greater than or equal to 1 millimeter and less than or equal to 6 millimeters and wherein the catalytic alloy pieces are contained and compacted in the container such that there are between 6 grams of alloy per cubic centimeter and 12 grams of alloy per cubic centimeter.

2. The fluids mechanical system for optimizing the catalytic effect of catalytic alloys for the elimination of microbiological contamination in hydrocarbon fuels according to claim 1, wherein the catalytic alloy pieces have spherical geometries whose diameter is 3 millimeters.

3. The fluids mechanical system for optimizing the catalytic effect of catalytic alloys for the elimination of microbiological contamination in hydrocarbon fuels according to claim 1, wherein the catalytic alloy pieces have disc geometry whose diameter is greater than or equal to 1 millimeters and less than or equal to 6 millimeters.

4. The fluids mechanical system for optimizing the catalytic effect of catalytic alloys for the elimination of microbiological contamination in hydrocarbon fuels according to claim 3, wherein the height of the disc catalytic alloy pieces is less than 3 millimeters.

5. The fluids mechanical system for optimizing the catalytic effect of catalytic alloys for the elimination of microbiological contamination in hydrocarbon fuels according to claim 1, wherein the catalytic alloy pieces have an irregular shape.

6. The fluids mechanical system for optimizing the catalytic effect of catalytic alloys for the elimination of microbiological contamination in hydrocarbon fuels according to claim 1, wherein the catalytic alloy pieces are contained and compacted in the container such that there are of 8.5 grams of alloy per cubic centimeters.

7. The fluids mechanical system for optimizing the catalytic effect of catalytic alloys for the elimination of microbiological contamination in hydrocarbon fuels according to claim 1, wherein it is contained in a device, which contains pieces of catalytic alloy and is fixed inside a fuel tank.

8. The fluids mechanical system for optimizing the catalytic effect of catalytic alloys for the elimination of microbiological contamination in hydrocarbon fuels according to claim 7, wherein the device is located on the lateral side of the fuel tank.

9. The fluids mechanical system for optimizing the catalytic effect of catalytic alloys for the elimination of microbiological contamination in hydrocarbon fuels according to claim 7, wherein the device is located on the lower side of the fuel tank.

10. A device for the catalytic purification of liquid hydrocarbon fuels according to claim 1 that has a solid housing which is a cylindrical stainless steel tube which has one or more holes along its body, having an internal container mesh close to the solid housing, catalytic alloy parts inside the container mesh, and lids at each end which retain the catalytic alloy pieces within the container mesh and the solid housing wherein the catalytic alloy pieces are compressed within the container mesh against the caps and the solid shell to a density of 8.5 grams of alloy per cubic centimeter.

11. The device for the catalytic purification of liquid hydrocarbon fuels according to claim 10, wherein the lids are made of a soft material, which absorbs vibrations and is insoluble in fossil fuels, preferably nitrile.

12. The device for the catalytic purification of liquid hydrocarbon fuels according to claim 11, wherein the lids have one or more stops, preferably 4.

13. The device for the catalytic purification of liquid hydrocarbon fuels according to claim 12, wherein the stops are parallel to the length of the solid housing.

14. The device for the catalytic purification of liquid hydrocarbon fuels according to claim 12, wherein the stops are equidistantly spaced apart.

15. The fluids mechanical system for optimizing the catalytic effect of catalytic alloys for the elimination of microbiological contamination in hydrocarbon fuels according to claim 1, wherein the volume of the catalytic alloy pieces is between 10 cubic millimeters and 45 cubic millimeters.

* * * * *